United States Patent
Baba (10) Patent No.: US 10,480,484 B2
(45) Date of Patent: Nov. 19, 2019

(54) WIND TURBINE, YAW CONTROL DEVICE, AND OPERATION CONTROL METHOD

(71) Applicant: MITSUBISHI HEAVY INDUSTRIES, LTD., Tokyo (JP)

(72) Inventor: Mitsuya Baba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 590 days.

(21) Appl. No.: 15/250,121

(22) Filed: Aug. 29, 2016

(65) Prior Publication Data

US 2017/0248121 A1 Aug. 31, 2017

(30) Foreign Application Priority Data

Feb. 29, 2016 (JP) .................................. 2016-037018

(51) Int. Cl.
*F03D 7/02* (2006.01)
*F03D 9/25* (2016.01)
*F03D 7/04* (2006.01)
*F03D 80/80* (2016.01)

(52) U.S. Cl.
CPC ........... *F03D 7/0204* (2013.01); *F03D 7/042* (2013.01); *F03D 9/25* (2016.05); *F03D 80/85* (2016.05)

(58) Field of Classification Search
None
See application file for complete search history.

(56) References Cited

U.S. PATENT DOCUMENTS

| 2010/0066087 A1 | 3/2010 | Hayashi et al. |
| 2010/0080702 A1 | 4/2010 | Matsuo et al. |
| 2010/0090463 A1 * | 4/2010 | Nies .................. F03D 7/0204 290/44 |
| 2011/0127772 A1 | 6/2011 | Fukami et al. |

FOREIGN PATENT DOCUMENTS

| EP | 2175127 A2 | 4/2010 |
| EP | 2902623 A1 * | 8/2015 ............. F03D 80/85 |
| EP | 2902623 A1 | 8/2015 |
| JP | H03-222872 A | 10/1991 |

(Continued)

OTHER PUBLICATIONS

Europe Patent Office, "Search Report for European Patent Application No. 16183117.7," dated Jul. 3, 2017.

(Continued)

*Primary Examiner* — Igor Kershteyn
*Assistant Examiner* — Juan G Flores
(74) *Attorney, Agent, or Firm* — Manabu Kanesaka; Kenneth Berner; Benjamin Hauptman (57) ABSTRACT

A wind turbine includes: a wind turbine rotor; a nacelle supporting the wind turbine rotor rotatably; a yaw rotation part configured to rotate the nacelle; and a yaw control part configured to operate the yaw rotation part in a yaw rewind mode of rotating the nacelle in such a direction that a yaw angle changes toward zero, if an absolute value of the yaw angle exceeds a threshold which is variable in accordance with a wind-velocity parameter representing a magnitude of a wind velocity. The threshold increases with an increase in the wind-velocity parameter.

13 Claims, 6 Drawing Sheets

(56) References Cited

FOREIGN PATENT DOCUMENTS

JP      2015-161172 A    9/2015
KR      20130023908 A    3/2013

OTHER PUBLICATIONS

Dai, C. et al., "Study on the Prevent Cable Twisting Control Strategy of Wind Turbine Yaw Control System," 2nd International Symposium on Instrumentation and Measurement, Sensor Network and Automation (IMSNA), 2013, p. 420-424, IEEE.
Mueller, I. et al., "ENERCON E-33-Technical Description," ENERCON Energy for the World, 2005, p. 1-17.
Japan Patent Office, "Office Action for Japanese Patent Application No. 2016-037018," dated Nov. 10, 2017.

* cited by examiner

WIND TURBINE, YAW CONTROL DEVICE, AND OPERATION CONTROL METHOD

RELATED APPLICATIONS

The present application is based on, and claims priority from, Japanese Application No. JP2016-037018 filed Feb. 29, 2016, the disclosure of which is hereby incorporated by reference herein in its entirety.

TECHNICAL FIELD

The present disclosure relates to a wind turbine, and a yaw control device and an operation control method for the wind turbine.

BACKGROUND ART

A wind turbine has been known which has a nacelle supporting a wind turbine rotor and is configured to make the nacelle yaw-rotate to follow a wind direction.

For instance, Patent Document 1 discloses a wind turbine with a nacelle, configured to rotate the nacelle to follow a wind direction detected by an anemoscope.

CITATION LIST

Patent Literature

Patent Document 1: JP2015-161172A

SUMMARY

As a result of yaw-rotating a nacelle to follow a wind direction during operation of a wind turbine, the yaw angle of the nacelle increases, and thereby a structure such as a cable and a wire extending between the nacelle and a tower may become twisted excessively. Thus, to keep the yaw angle of the nacelle within an appropriate range, it is necessary to stop the wind turbine temporarily to yaw-rotate the nacelle in a rewind (backward) direction.

However, the wind turbine cannot output power while the nacelle is yaw-rotating in the rewind direction, which is not economic.

In this regard, Patent Document 1 does not disclose keeping the yaw angle of a nacelle within an appropriate range while reducing an influence of yaw rotation in the rewind direction on an output of a wind turbine.

An object of at least some embodiments of the present invention is to provide a wind turbine, a yaw rotation device for the wind turbine, and an operation control method for the wind turbine, whereby it is possible to prevent the yaw angle of a nacelle from being excessively large while reducing an influence of yaw rotation in the rewind direction on an output of the wind turbine.

(1) A wind turbine according to at least some embodiments of the present invention comprises: a wind turbine rotor; a nacelle supporting the wind turbine rotor rotatably; a yaw rotation part configured to rotate the nacelle; and a yaw control part configured to operate the yaw rotation part in a yaw rewind mode of rotating the nacelle in such a direction that a yaw angle changes toward zero, if an absolute value of the yaw angle exceeds a threshold which is variable in accordance with a wind-velocity parameter representing a magnitude of a wind velocity. The threshold increases with an increase in the wind-velocity parameter.

With the above configuration (1), the threshold of the yaw angle, which is a basis for determining whether to shift to the yaw rewind mode, is increased with an increase in the wind-velocity parameter, and thereby it is possible to increase the frequency of shift to the yaw rewind mode if the wind velocity is so low that a high output cannot be expected from the wind turbine. Accordingly, it is possible to reduce the need to perform yaw rewind when the wind velocity is high and a high output can be expected from the wind turbine, by operating the yaw rotation part in the yaw rewind mode when the wind velocity is low and a high output of the wind turbine cannot be expected in the first place. Thus, it is possible to prevent the yaw angle from being excessively large while reducing an influence on a wind-turbine output.

(2) In some embodiments, in the above configuration (1), the threshold is set in stages in accordance with a plurality of ranges of the wind-velocity parameter.

With the above configuration (2), the threshold of the yaw angle, which is a basis for determining whether to shift to the yaw rewind mode, is set in stages so as to increase with an increase in the wind-velocity parameter in accordance with a plurality of ranges of the wind-velocity parameter, and thereby it is possible to prevent the yaw angle from being excessively large while reducing an influence on a wind-turbine output.

(3) In some embodiments, in the above configuration (1), the threshold is set to increase monotonically with an increase in the wind-velocity parameter.

With the above configuration (3), the threshold of the yaw angle, which is a basis for determining whether to shift to the yaw rewind mode, is set so as to increase monotonically with an increase in the wind-velocity parameter, and thereby it is possible to prevent the yaw angle from being excessively large while reducing an influence on a wind-turbine output.

(4) In some embodiments, in any one of the above configurations (1) to (3), a maximum value of the threshold is smaller than a hardware limit which is a rotational limit of the nacelle.

With the above configuration (4), the maximum value of the threshold of the yaw angle, which is a basis for determining whether to shift to the yaw rewind mode, is set to be smaller than the hardware limit, and thereby a software control in the yaw rewind mode runs prior to a hardware-based protecting operation, regardless of the wind-velocity parameter. As a result, it is possible to securely prevent the yaw angle from being excessively large while maintaining redundancy of the software control and the hardware-based protecting operation.

(5) In some embodiments, in any one of the above configurations (1) to (4), the yaw control part is configured to change the yaw angle to within a predetermined angular range without making the nacelle follow a wind direction, if the yaw control part controls the yaw rotation part in the yaw rewind mode when the wind-velocity parameter is not greater than the threshold.

With the above configuration (5), at a wind velocity so small that the wind direction is unstable, yaw rotation can still be performed stably in the yaw rewind mode even if the wind direction becomes unstable during yaw rewind, by performing yaw rewind without making the nacelle follow the wind direction until the yaw angle falls within a predetermined angular range.

(6) In some embodiments, in any one of the above configurations (1) to (5), the threshold is set to be larger during operation of the wind turbine than during a standby state of the wind turbine.

With the above configuration (6), the threshold of the yaw angle, which is a basis for determining whether to shift to the yaw rewind mode, is varied depending on the state of the wind turbine, and thereby it is possible to reduce an influence of yaw rewind on a wind-turbine output and to prevent the yaw angle from being excessively large.

Specifically, if the wind turbine is already operating, a relatively large threshold is set for the yaw angle, and thereby it is possible to reduce the frequency of yaw rewind and to ensure a wind-turbine output. On the other hand, if the wind velocity is low and the wind turbine is in a standby state, a high output from the wind turbine cannot be expected, or a possible wind-turbine output cannot be estimated, and thus the threshold of the yaw angle is set relatively small to increase the frequency of yaw rewind, and thereby it is possible to reduce the need of yaw rewind after restarting operation of the wind turbine in future.

(7) In some embodiments, in any one of the above configurations (1) to (6), the wind-velocity parameter includes at least one of a wind velocity, an output of the wind turbine, a rotation speed of the wind turbine rotor, or a torque of the wind turbine rotor.

(8) In some embodiments, in any one of the above configurations (1) to (6), the wind-velocity parameter is a statistical value, in a predetermined period, of at least one of a wind velocity, an output of the wind turbine, a rotation speed of the wind turbine rotor, or a torque of the wind turbine rotor. For instance, an average may be used as the statistical value.

With the above configuration (7) or (8), an index related to an output of the wind turbine, such as a wind velocity, an output of the wind turbine, a rotation speed of the wind turbine rotor, and a torque of the wind turbine rotor, is used as a wind-velocity parameter, and thereby it is possible to perform yaw rewind in priority when the wind velocity is low and a high output cannot be expected from the wind turbine in the first place. As a result, it is possible to prevent the yaw angle from being excessively large while reducing an influence on a wind-turbine output.

(9) A yaw control device according to some embodiments of the present invention is used for the wind turbine according to any one of the above (1) to (8), and configured to operate the yaw rotation part of the wind turbine in a yaw rewind mode of rotating the nacelle of the wind turbine in such a direction that a yaw angle changes toward zero, if an absolute value of the yaw angle exceeds a threshold which is variable in accordance with a wind-velocity parameter representing a magnitude of a wind velocity. The threshold increases with an increase in the wind-velocity parameter.

With the above configuration (9), the threshold of the yaw angle, which is a basis for determining whether to shift to the yaw rewind mode, is increased with an increase in the wind-velocity parameter, and thereby it is possible to increase the frequency of shift to the yaw rewind mode if the wind velocity is so low that a high output cannot be expected from the wind turbine. Accordingly, it is possible to reduce the need to perform yaw rewind when the wind velocity is high and a high output can be expected from the wind turbine, by operating the yaw rotation part in the yaw rewind mode when the wind velocity is low and a high output of the wind turbine cannot be expected in the first place. Thus, it is possible to prevent the yaw angle from being excessively large while reducing an influence on a wind-turbine output.

(10) A method, according to some embodiments of the present invention, is for controlling operation of a wind turbine which comprises a wind turbine rotor, a nacelle supporting the wind turbine rotor rotatably, and a yaw rotation part configured to rotate the nacelle. The method comprises: a step of operating the yaw rotation part in a yaw rewind mode of rotating the nacelle in such a direction that a yaw angle changes toward zero, if an absolute value of the yaw angle exceeds a threshold which is variable in accordance with a wind-velocity parameter representing a magnitude of a wind velocity. The threshold increases with an increase in the wind-velocity parameter.

According to the above method (10), the threshold of the yaw angle, which is a basis for determining whether to shift to the yaw rewind mode, is increased with an increase in the wind-velocity parameter, and thereby it is possible to increase the frequency of shift to the yaw rewind mode if the wind velocity is so low that a high output cannot be expected from the wind turbine. Accordingly, it is possible to reduce the need to perform yaw rewind when the wind velocity is high and a high output can be expected from the wind turbine, by operating the yaw rotation part in the yaw rewind mode when the wind velocity is low and a high output of the wind turbine cannot be expected in the first place. Thus, it is possible to prevent the yaw angle from being excessively large while reducing an influence on a wind-turbine output.

(11) In some embodiments, in the above method (10), the threshold is set in stages in accordance with a plurality of ranges of the wind-velocity parameter.

According to the above method (11), the threshold of the yaw angle, which is a basis for determining whether to shift to the yaw rewind mode, is set in stages so as to increase with an increase in the wind-velocity parameter in accordance with a plurality of ranges of the wind-velocity parameter, and thereby it is possible to prevent the yaw angle from being excessively large while reducing an influence on a wind-turbine output.

(12) In some embodiments, in the above method (10), the threshold is set to increase monotonically with an increase in the wind-velocity parameter.

According to the above method (12), the threshold of the yaw angle, which is a basis for determining whether to shift to the yaw rewind mode, is set so as to increase monotonically with an increase in the wind-velocity parameter, and thereby it is possible to prevent the yaw angle from being excessively large while reducing an influence on a wind-turbine output.

(13) In some embodiments, in any one of the above methods (10) to (12), a maximum value of the threshold is smaller than a hardware limit which is a rotational limit of the nacelle.

According to the above method (13), the maximum value of the threshold of the yaw angle, which is a basis for determining whether to shift to the yaw rewind mode, is set to be smaller than the hardware limit, and thereby a software control in the yaw rewind mode runs prior to a hardware-based protecting operation regardless of the wind-velocity parameter. As a result, it is possible to securely prevent the yaw angle from being excessively large while maintaining redundancy of the software control and the hardware-based protecting operation.

(14) In some embodiments, the method according to any one of the above (10) to (13) further comprises changing the yaw angle to within a predetermined angular range without making the nacelle follow a wind direction, if the yaw rotation part is controlled in the yaw rewind mode when the wind-velocity parameter is not greater than the threshold.

According to the above method (14), at a wind velocity so small that the wind direction is unstable, yaw rotation can still be performed stably in the yaw rewind mode even if the wind direction becomes unstable during yaw rewind, by performing yaw rewind without making the nacelle follow the wind direction until the yaw angle falls within a predetermined angular range.

(15) In some embodiments, the method according to any one of the above (10) to (14) further comprises setting the threshold to be larger during operation of the wind turbine than during a standby state of the wind turbine.

According to the above method (15), the threshold of the yaw angle, which is a basis for determining whether to shift to the yaw rewind mode, is varied depending on the state of the wind turbine, and thereby it is possible to reduce an influence of yaw rewind on a wind-turbine output and to prevent the yaw angle from being excessively large at the same time.

Specifically, if the wind turbine is already operating, a relatively large threshold is set for the yaw angle, and thereby it is possible to reduce the frequency of yaw rewind and to ensure a wind-turbine output. On the other hand, if the wind velocity is low and the wind turbine is in a standby state, a high output from the wind turbine cannot be expected, or a possible wind-turbine output cannot be estimated, and thus the threshold of the yaw angle is set to be relatively small to increase the frequency of yaw rewind, which makes it possible to reduce the need of yaw rewind after restarting operation of the wind turbine in future.

According to at least some embodiments of the present invention, it is possible to reduce the need to perform yaw rewind when the wind velocity is high and a high output can be expected from the wind turbine, by operating the yaw rotation part in the yaw rewind mode when the wind velocity is low and a high output of the wind turbine cannot be expected in the first place. Thus, it is possible to prevent the yaw angle from being excessively large while reducing an influence on a wind-turbine output.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
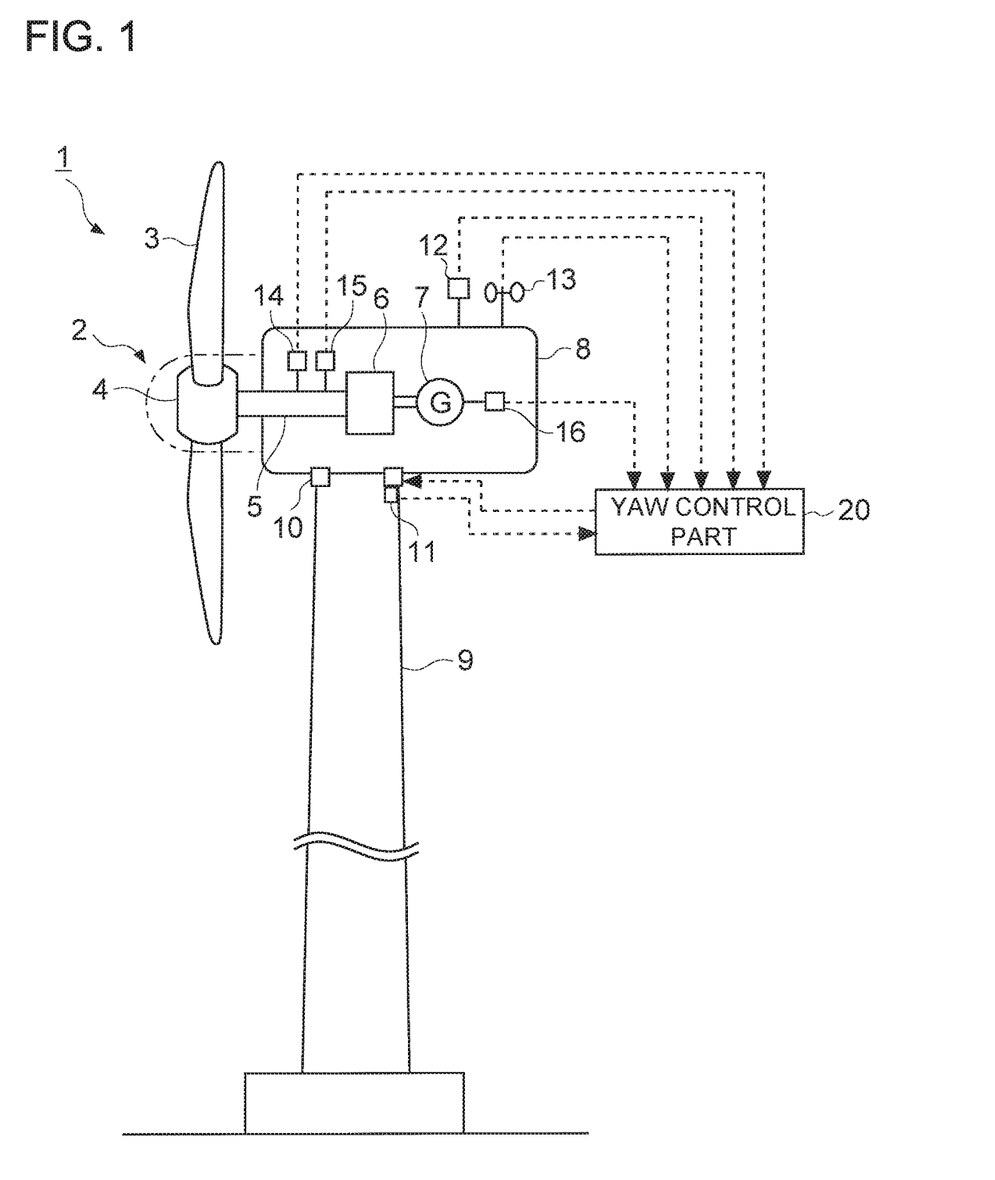
FIG. 1 is an overall schematic configuration diagram of a wind turbine according to an embodiment.

Firstly, with reference to FIG. 1, a wind turbine 1 according to some embodiments will be described. FIG. 1 is a schematic overall configuration diagram of the wind turbine 1 according to an embodiment.

In some embodiments, the wind turbine 1 includes a wind turbine rotor 2, a nacelle 8 supporting the wind turbine rotor 2 rotatably, and a yaw rotation part 10 configured to rotate the nacelle 8.

The wind turbine 1 is provided with a yaw-angle sensor 11 for detecting a yaw angle of the nacelle 8 (wind turbine rotor 2). For instance, the yaw-angle sensor 11 may detect the yaw angle of the wind turbine rotor 2 on the basis of a rotation speed and a rotational direction of a yaw-driving motor of the yaw rotation part 10.

Figure 2:
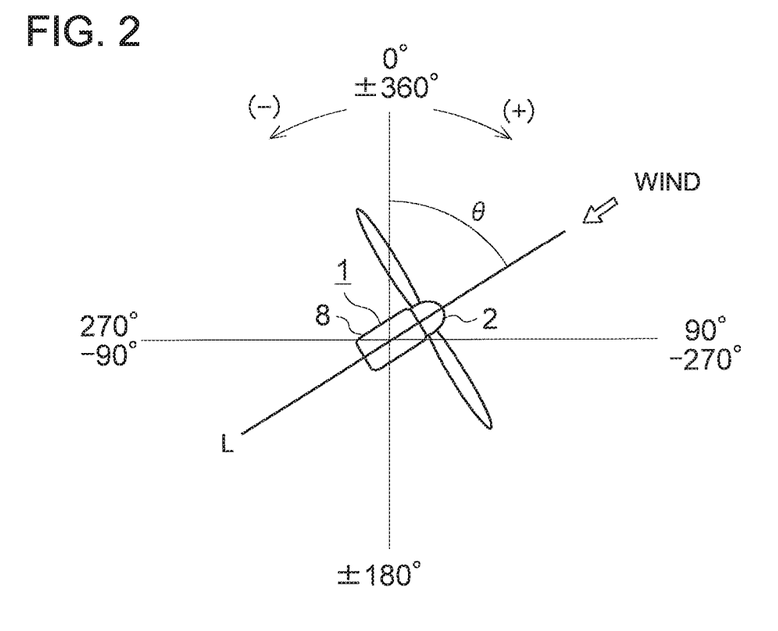
FIG. 2 is a diagram for describing a yaw angle.

A yaw angle herein is a cumulative rotational angle of rotation from a zero angle, where zero (basis) is an angle of the yaw rotational direction in an initial state (normally, cables or the like are not twisted in an initial state) formed between the nacelle 8 and the tower 9 (see FIG. 2). A sensor for measuring the yaw angle is referred to as a yaw-angle sensor 11.

Furthermore, the wind turbine 1 may be further provided with at least one of an anemoscope 12 for measuring a wind direction, an anemometer 13 for measuring a wind velocity, a rotation-speed sensor 14 for measuring a rotation speed of a main shaft 5, a torque sensor 15 for measuring a torque of the main shaft 5, or an output sensor 16 for measuring an output of the wind turbine 1.

The wind turbine rotor 2 includes at least one blade 3, and a hub 4 to which the at least one blade 3 is mounted. The wind turbine rotor 2 is supported to the nacelle 8 via a main bearing.

The nacelle 8 is supported rotatably in the yaw direction on an upper end of the tower 9, and is configured to be oriented in a desired direction by the yaw rotation part 10. The tower 9 may be installed onshore, or offshore such as on ocean and on lake.

In the case where the wind turbine 1 is a wind turbine power generating apparatus as depicted, the main shaft 5 rotates along with the wind turbine rotor 2, and the rotation is inputted to a generator 7 via a drive train 6. In this way, the generator 7 is driven. The drive train 6 may be a direct drive with the wind turbine rotor 2 directly coupled to the generator 7, a hydraulic transmission including a hydraulic pump and a hydraulic motor, a gear box, or the like.

The yaw rotation part 10 is configured to rotate the nacelle 8 in the yaw direction. Specifically, the yaw rotation part 10 changes the direction of the wind turbine rotor 2 in the yaw direction, along with that of the nacelle 8. In the wind turbine 1, typically, the yaw rotation part 10 is controlled by a yaw control part 20 described below to perform a wind-direction following control on the yaw angle, so as to adjust the direction of the wind turbine rotor 2 in the yaw direction along with the wind direction.

The wind turbine 1 further includes the yaw control part 20 for controlling the yaw rotation part 10.

The yaw control part 20 is configured to operate the yaw rotation part in a yaw rewind mode of rotating the nacelle 8 in such a direction that the yaw angle changes toward zero, if the absolute value of the yaw angle exceeds a threshold.

The threshold is variable in accordance with a wind-velocity parameter that represents the magnitude of the wind velocity, and increases with an increase in the wind-velocity parameter.

A wind-velocity parameter herein is an index representing the magnitude of a wind velocity. A wind-velocity parameter may be the wind velocity itself measured by the anemometer 13, or a measurement value correlated to the wind velocity. A measurement value that can be used as a wind-velocity parameter may be one of the rotation speed of the wind turbine rotor 2 (main shaft 5) measured by the rotation-speed sensor 14, the torque of the wind turbine rotor 2 (main shaft 5) measured by the torque sensor 15, or the output measured by the output sensor 16. Alternatively, the wind-velocity parameter may be a statistical value (e.g. average) in a predetermined period of at least one of the wind velocity, the output of the wind turbine 1, the rotation speed of the wind turbine rotor 2, or the torque of the wind turbine rotor 2.

Accordingly, an index related to an output of the wind turbine such as the wind velocity, the output of the wind turbine, the rotation speed of the wind turbine rotor 2, or the torque of the wind turbine rotor 2, is used as a wind-velocity parameter, and thereby it is possible to perform yaw rewind in priority when the wind velocity is low and a high output cannot be expected from the wind turbine 1 in the first place. As a result, it is possible to prevent the yaw angle from becoming excessively large while reducing an influence on a wind-turbine output.

As depicted in FIG. 2, the yaw angle θ is an angle of the wind turbine rotor 2, where a reference direction is defined as 0 deg with respect to the yaw rotational direction. Herein, from the reference direction of 0 deg, one rotational direction (the clockwise direction in the drawing) is referred to as positive, and the opposite rotational direction (the anti-clockwise direction in the drawing) is referred to as negative.

For the wind turbine 1 of a typical configuration, the main wind direction at each wind-turbine site is normally set as the reference direction 0 deg (yaw-angle sensor 11=0 deg) so as to reduce cable rotation.

With the above configuration, the threshold of the yaw angle, which is a basis for determining whether to shift to the yaw rewind mode, is increased with an increase in the wind-velocity parameter, and thereby it is possible to increase the frequency of shift to the yaw rewind mode if the wind velocity is so low that a high output cannot be expected from the wind turbine 1. Accordingly, it is possible to reduce the need to perform yaw rewind when the wind velocity is high and a high output can be expected from the wind turbine 1, by operating the yaw rotation part 10 in the yaw rewind mode if a high output of the wind turbine 1 cannot be expected in the first place. Thus, it is possible to prevent the yaw angle from being excessively large while reducing an influence on a wind-turbine output.

Figure 3:
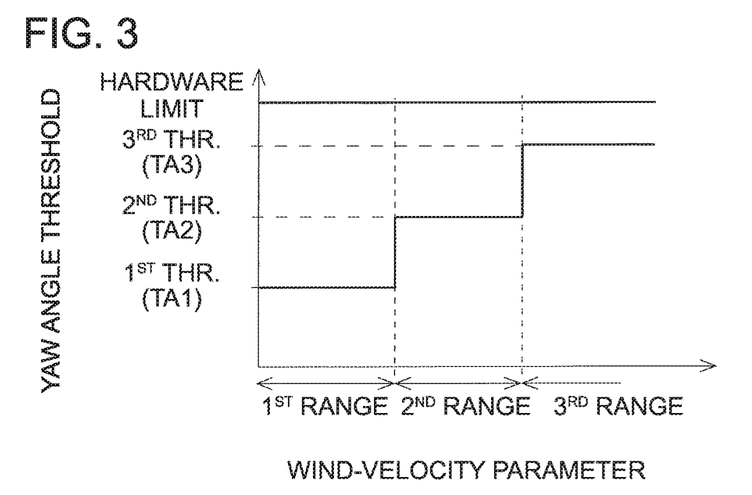
FIG. 3 is a graph showing a relationship between a wind-velocity parameter and a yaw-angle threshold in an embodiment.

FIG. 3 is a graph showing a relationship between a wind-velocity parameter and a yaw-angle threshold in an embodiment.

In an embodiment, the above described threshold may be set in stages in accordance with a plurality of ranges of the wind-velocity parameter. In the example depicted in FIG. 3, three ranges including the first to three ranges are set for the wind-velocity parameter in an increasing order, and each range is associated with a corresponding threshold. The first threshold (TA1) associated with the first range is the smallest, and the second threshold (TA2) associated with the second range and the third threshold (TA3) associated with the third range increase in this order with an increase in the wind-velocity parameter.

With the above configuration, the threshold of the yaw angle, which is a basis for determining whether to shift to the yaw rewind mode, is set in stages so as to increase with an increase in the wind-velocity parameter in accordance with a plurality of ranges of the wind-velocity parameter, and thereby it is possible to prevent the yaw angle from being excessively large while reducing an influence on a wind-turbine output.

Figure 4:
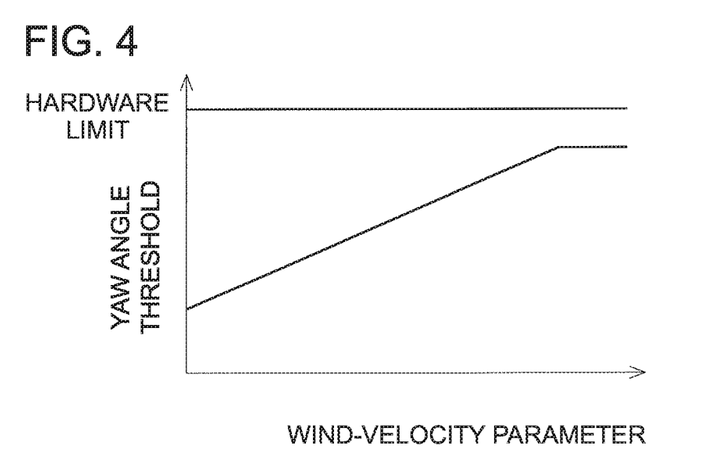
FIG. 4 is a graph showing a relationship between a wind-velocity parameter and a yaw-angle threshold in another embodiment.

FIG. 4 is a graph showing a relationship between a wind-velocity parameter and a yaw-angle threshold in another embodiment.

In another embodiment, the above described threshold may be set to increase monotonically in accordance with an increase in the wind-velocity parameter. While the threshold increases proportionally with the wind-velocity parameter in the example depicted in FIG. 4, a relationship between the threshold and the wind-velocity parameter is not limited to a linear function. That is, it is sufficient if the threshold satisfies a relationship of monotonically increasing with an increase in the wind-velocity parameter. Furthermore, the threshold may include a predetermined range in the relationship between the threshold and the wind-velocity parameter depicted in FIG. 4.

With the above configuration, the threshold of the yaw angle, which is a basis for determining whether to shift to the yaw rewind mode, is set so as to increase monotonically with an increase in the wind-velocity parameter, and thereby it is possible to prevent the yaw angle from being excessively large while reducing an influence on a wind-turbine output.

Figure 5:
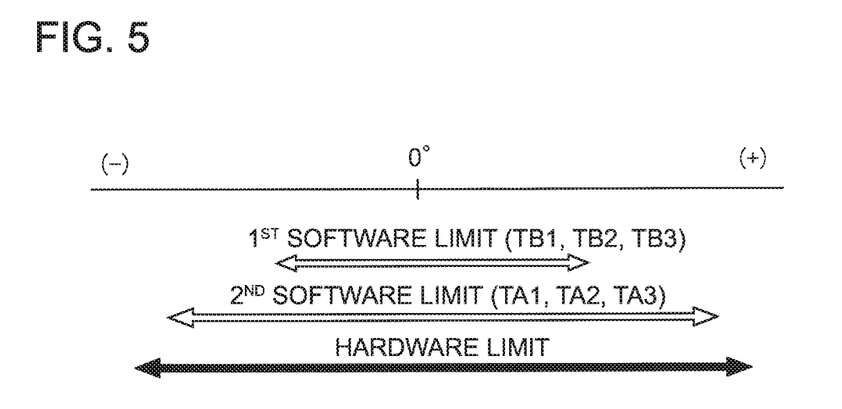
FIG. 5 is a diagram schematically showing software limits and a hardware limit.

FIG. 5 is a diagram schematically showing software limits and a hardware limit.

In the example depicted in the drawing, the software limits include the first software limit for a standby state and the second software limit for an operation state.

In some embodiments, the maximum value of the threshold is smaller than the hardware limit. The hardware limit is a limit value for executing a command (e.g. an emergency stop) through physical connection by hardware, which is set independently from the software limit. For instance, if the yaw angle detected by the yaw-angle sensor 11 reaches the hardware limit, there is a possibility of occurrence of abnormality in the yaw control part 20. Thus, yaw rotation (including yaw rewind) is not performed, and the wind turbine 1 is brought into an emergency stop.

With the above configuration, the maximum value of the threshold of the yaw angle, which is a basis for determining whether to shift to the yaw rewind mode, is set to be smaller than the hardware limit, and thereby a software control in the yaw rewind mode runs prior to a hardware-based protecting operation, regardless of the wind-velocity parameter. As a result, it is possible to securely prevent the yaw angle from being excessively large while maintaining redundancy of the software control and the hardware-based protecting operation.

As depicted in FIG. 5, the software limit may be set in multiple stages. In other words, a plurality of software limits may be set to be selected in accordance with different states of the wind turbine 1. For instance, the first software limit (e.g. thresholds TB1, TB2, TB3) is applied if the wind turbine 1 is in the standby state, and the second software limit (e.g. thresholds TA1, TA2, TA3) is applied if the wind turbine 1 is in the operation state.

In an embodiment, the yaw control part 20 is configured to change the yaw angle to within a predetermined angular range without making the nacelle follow the wind direction, in the case of controlling the yaw rotation part 10 in the yaw rewind mode when the wind-velocity parameter is not greater than a threshold (hereinafter, referred to as a lower-limit threshold).

Accordingly, at a wind velocity so small that the wind direction is unstable, yaw rotation can still be performed stably in the yaw rewind mode even if the wind direction becomes unstable during yaw rewind, by performing yaw rewind without making the nacelle follow the wind direction until the yaw angle falls within a predetermined angular range.

Figure 6:
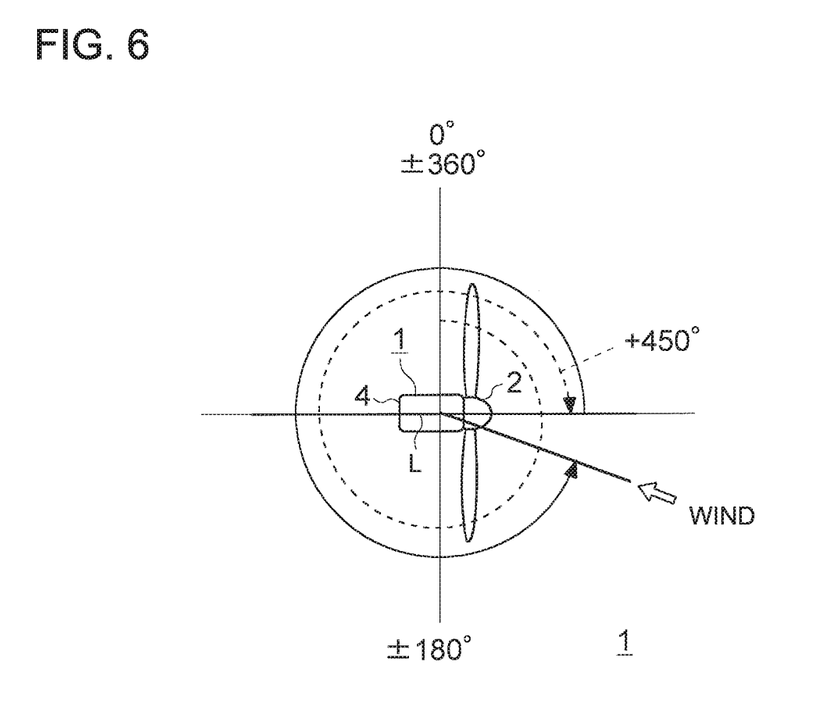
FIG. 6 is a diagram for describing a yaw control (yaw rewind mode) of a wind turbine according to an embodiment.

In another embodiment, if the wind-velocity parameter is greater than the lower-limit threshold, the yaw control part 20 causes the wind turbine 1 to follow the wind direction when the wind direction becomes suitable during yaw rewind, while controlling the yaw rotation part 10 in the yaw rewind mode. For instance, as depicted in FIG. 6, in an instance where the wind turbine 1 yaw-rotates to 450°, which is the software limit, and then the wind direction changes to the direction of 450° or more, the yaw angle would exceed 450° if yaw rotation is performed as in normal operation. Thus, the control is switched to the yaw rewind mode of rotating in the negative direction. In the yaw rewind mode, the wind turbine 1 is not returned to the zero yaw angle, but is stopped at an angle corresponding to a wind direction, and operation is restarted from the stopped position.

Furthermore, the threshold may be set to be greater during operation of the wind turbine 1 than during the standby state of the wind turbine 1.

With the above configuration, the threshold of the yaw angle, which is a basis for determining whether to shift to the yaw rewind mode, is varied depending on the state of the wind turbine 1, and thereby it is possible to reduce an influence of yaw rewind on a wind-turbine output and to prevent the yaw angle from being excessively large at the same time.

Specifically, if the wind turbine 1 is already operating as depicted in FIG. 5, the second software limit is applied to set a relatively large threshold for the yaw angle, and thereby it is possible to reduce the frequency of yaw rewind and to ensure a wind-turbine output. Furthermore, if the wind velocity is low and the wind turbine is in a standby state, a high output from the wind turbine cannot be expected, or a possible wind-turbine output cannot be estimated, and thus the first software limit is applied and the threshold of the yaw angle is set to be relatively small to increase the frequency of yaw rewind, which makes it possible to reduce the need of yaw rewind after restarting operation of the wind turbine in future. In the above configuration, while the first software limit and the second software limit are variable depending on the wind-velocity parameter, a relative relationship between the first software limit and the second software limit is unchanged. In other words, while the wind-velocity parameter changes, the first software limit stays smaller than the second software limit. Furthermore, the second software limit is smaller than the hardware limit.

Next, with reference to FIGS. 7 and 8, a method of controlling operation of the wind turbine 1 according to some embodiments will be described. The same reference numerals in FIG. 1 are used where suitable in the following description.

A method of controlling operation of the wind turbine 1 according to some embodiments includes a step of operating the yaw rotation part in the yaw rewind mode of rotating the nacelle in such a direction that the yaw angle changes toward zero, when the absolute value of the yaw angle exceeds a threshold which is variable in accordance with the wind-velocity parameter indicating the magnitude of the wind velocity.

Furthermore, the threshold increases with an increase in the wind-velocity parameter.

According to the above method, the threshold of the yaw angle, which is a basis for determining whether to shift to the yaw rewind mode, is increased with an increase in the wind-velocity parameter, and thereby it is possible to increase the frequency of shift to the yaw rewind mode if the wind velocity is so low that a high output cannot be expected from the wind turbine. Accordingly, it is possible to reduce the need to perform yaw rewind when the wind velocity is high and a high output can be expected from the wind turbine 1, by operating the yaw rotation part in the yaw rewind mode if a high output of the wind turbine 1 cannot be expected in the first place. Thus, it is possible to prevent the yaw angle from being excessively large while reducing an influence on a wind-turbine output.

In the above method, the threshold may be set in stages in accordance with a plurality of ranges of the wind-velocity parameter, or the threshold may be set to increase monotonically with an increase in the wind-velocity parameter.

According to this method, the threshold of the yaw angle, which is a basis for determining whether to shift to the yaw rewind mode, is set in stages so as to increase with the wind-velocity parameter in accordance with a plurality of ranges of the wind-velocity parameter, and thereby it is possible to prevent the yaw angle from being excessively large while reducing an influence on a wind-turbine output.

The maximum value of the threshold is smaller than a hardware limit, which is a rotational limit of the nacelle.

According to the above method, the maximum value of the threshold of the yaw angle, which is a basis for determining whether to shift to the yaw rewind mode, is set to be smaller than the hardware limit, and thereby a software control in the yaw rewind mode runs prior to a hardware-based protecting function, regardless of the wind-velocity parameter. As a result, it is possible to securely prevent the yaw angle from being excessively large while maintaining redundancy of the software control and the hardware-based protecting operation.

Further, the yaw angle may be changed to within a predetermined angular range without making the nacelle follow the wind direction, in the case of controlling the yaw rotation part in the yaw rewind mode when the wind-velocity parameter is not greater than the threshold.

Accordingly, at a wind velocity so small that the wind direction is unstable, yaw rotation can still be performed stably in the yaw rewind mode even if the wind direction becomes unstable during yaw rewind, by performing yaw rewind without making the nacelle follow the wind direction until the yaw angle falls within a predetermined angular range.

Furthermore, the threshold is set to be greater during operation of the wind turbine 1 than during the standby state of the wind turbine 1.

According to the above method, the threshold of the yaw angle, which is a basis for determining whether to shift to the yaw rewind mode, is varied depending on the state of the wind turbine, and thereby it is possible to reduce an influence of yaw rewind on a wind-turbine output and to prevent the yaw angle from being excessively large at the same time.

Specifically, if the wind turbine 1 is already operating as depicted in FIG. 5, the second software limit is applied to set a relatively large threshold for the yaw angle, and thereby it is possible to reduce the frequency of yaw rewind and to ensure a wind-turbine output. Furthermore, if the wind velocity is low and the wind turbine is in the standby state, a high output from the wind turbine cannot be expected, or a possible wind-turbine output cannot be estimated. Thus, the first software limit is applied and the threshold of the yaw angle is set to be relatively small to increase the frequency of yaw rewind, which makes it possible to reduce the need of yaw rewind after restarting operation of the wind turbine in future.

A method of controlling operation of the wind turbine 1 depicted in FIGS. 7 and 8 will now be described in detail.

Figure 7:
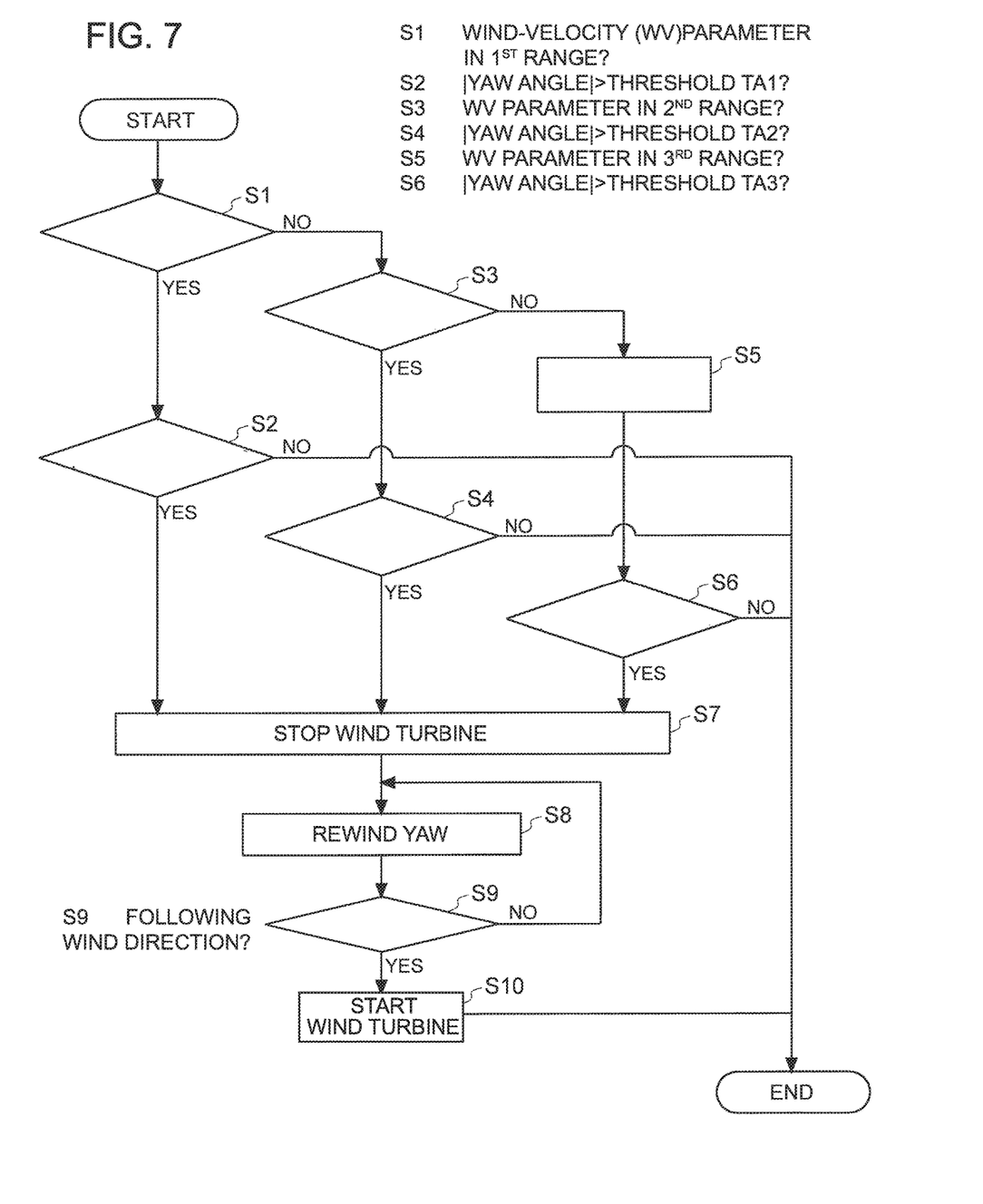
FIG. 7 is a diagram for describing an operation control method (in an operation state) of a wind turbine according to an embodiment.

FIG. 7 is a diagram for describing an operation control method of the wind turbine 1 according to an embodiment, where the wind turbine is in the operation state.

In the drawing, the yaw control part 20 is provided with a wind-velocity parameter, and determines whether the wind-velocity parameter is in the first range (S1). If the wind-velocity parameter is in the first range, the threshold TA1 corresponding to the first range of the wind-velocity parameter is compared to the absolute value of the yaw angle obtained by the yaw-angle sensor 11 (S2). If the absolute value of the yaw angle is greater than the threshold TA1, the wind turbine 1 is stopped (S7).

If the wind-velocity parameter is in the second range (S3), the threshold TA2 corresponding to the second range of the wind-velocity parameter is compared to the absolute value of the yaw angle obtained by the yaw-angle sensor 11 (S4). If the absolute value of the yaw angle is greater than the threshold TA2, the wind turbine 1 is stopped (S7).

If the wind-velocity parameter is in neither the first range nor the second range, that is, if the wind-velocity parameter is in the third range (S5), the threshold TA3 corresponding to the third range of the wind-velocity parameter is compared to the absolute value of the yaw angle obtained by the yaw-angle sensor 11 (S6). If the absolute value of the yaw angle is greater than the threshold TA3, the wind turbine 1 is stopped (S7).

After the wind turbine 1 is stopped, yaw rewind is performed (S8). Even before the yaw angle reaches zero, wind-direction following is started if the wind direction becomes suitable (S9), and the wind turbine 1 is started (S10).

Figure 8:
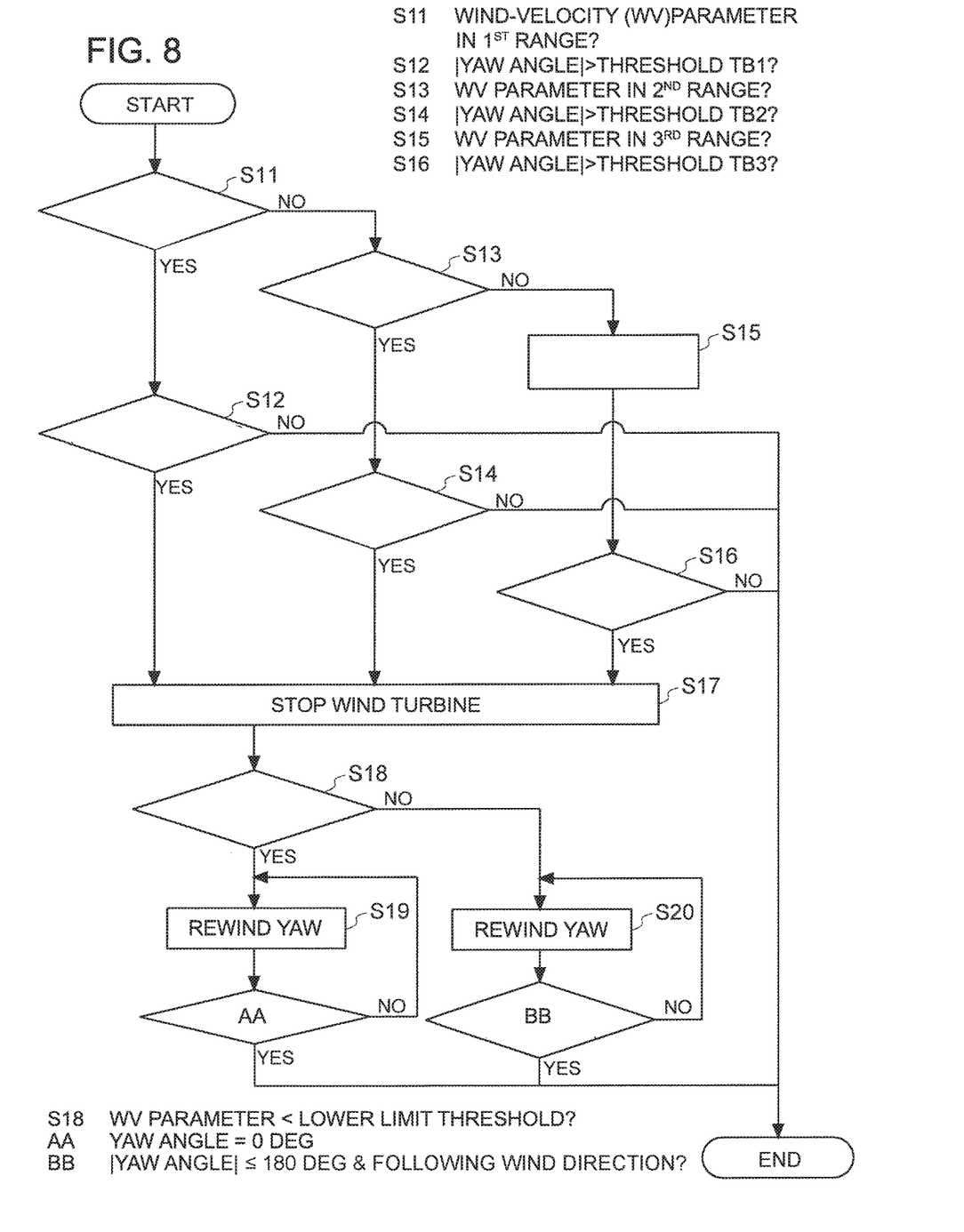
FIG. 8 is a diagram for describing an operation control method (in a standby state) of a wind turbine according to an embodiment.

FIG. 8 is a diagram for describing an operation control method of the wind turbine 1 according to an embodiment, where the wind turbine 1 is in the standby state.

In the drawing, the yaw control part 20 is provided with a wind-velocity parameter, and determines whether the wind-velocity parameter is in the first range (S11). If the wind-velocity parameter is in the first range, the threshold TB1 corresponding to the first range of the wind-velocity parameter is compared to the absolute value of the yaw angle obtained by the yaw-angle sensor 11 (S12), and the wind turbine 1 is stopped if the absolute value of the yaw angle is greater than the threshold TB1 (S17).

If the wind-velocity parameter is in the second range (S13), the threshold TB2 corresponding to the second range of the wind-velocity parameter is compared to the absolute value of the yaw angle (S14), and the wind turbine 1 is stopped if the absolute value of the yaw angle is greater than the threshold TA2 (S17).

If the wind-velocity parameter is in the third range (S15), the threshold TB3 corresponding to the third range of the wind-velocity parameter is compared to the absolute value of the yaw angle (S16), and the wind turbine 1 is stopped if the absolute value of the yaw angle is greater than the threshold TB3 (S17).

After the wind turbine 1 is stopped, it is determined whether the wind-velocity parameter is smaller than the lower-limit threshold (S18). If the wind-velocity parameter is smaller than the lower-limit threshold, yaw rewind is performed until the yaw angle returns to zero (S19). On the other hand, if the wind-velocity parameter is at the lower-limit threshold or more, yaw rewind is performed until the absolute value of the yaw angle reaches 180 deg or less and the wind turbine 1 follows the wind direction (S20). In other words, if the wind-velocity parameter is at the lower-limit threshold or more, yaw rewind is ended when the absolute value of the yaw angle reaches 180 deg or less and the nacelle follows the wind direction.

As described above according to at least some embodiments of the present invention, it is possible to reduce the need to perform yaw rewind when the wind velocity is high and a high output can be expected from the wind turbine 1, by operating the yaw rotation part 10 in the yaw rewind mode if a high output of the wind turbine 1 cannot be expected in the first place. Thus, it is possible to prevent the yaw angle from being excessively large while reducing an influence on a wind-turbine output.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A wind turbine comprising:
   a wind turbine rotor;
   a nacelle supporting the wind turbine rotor rotatably;
   a yaw rotation part configured to rotate the nacelle; and
   a yaw control part configured to operate the yaw rotation part in a yaw rewind mode of rotating the nacelle in such a direction that a yaw angle changes toward zero, if an absolute value of the yaw angle exceeds a threshold which is variable in accordance with a wind-velocity parameter representing a magnitude of a wind velocity,
   wherein the threshold increases with an increase in the wind-velocity parameter, and
   the yaw control part is configured to:
   in the rewind mode, change the yaw angle to within a predetermined angular range without making the nacelle follow a wind direction when the wind-velocity parameter is less than the threshold; and
   in the rewind mode, change the yaw angle until an absolute value of the yaw angle reaches 180 degrees or less and the nacelle follows the wind direction when the wind-velocity parameter is not less than the threshold.

2. The wind turbine according to claim 1,
   wherein the threshold is set in stages in accordance with a plurality of ranges of the wind-velocity parameter.

3. The wind turbine according to claim 1,
wherein the threshold is set to increase monotonically with an increase in the wind-velocity parameter.

4. The wind turbine according to claim 1,
wherein a maximum value of the threshold is smaller than a hardware limit which is a rotational limit of the nacelle.

5. The wind turbine according to claim 1,
wherein the threshold is set to be larger during operation of the wind turbine than during a standby state of the wind turbine.

6. The wind turbine according to claim 1,
wherein the wind-velocity parameter includes at least one of a wind velocity, an output of the wind turbine, a rotation speed of the wind turbine rotor, or a torque of the wind turbine rotor.

7. The wind turbine according to claim 1,
wherein the wind-velocity parameter is a statistical value, in a predetermined period, of at least one of a wind velocity, an output of the wind turbine, a rotation speed of the wind turbine rotor, or a torque of the wind turbine rotor.

8. A yaw control device used for the wind turbine according to claim 1, configured to operate the yaw rotation part of the wind turbine in a yaw rewind mode of rotating the nacelle of the wind turbine in such a direction that a yaw angle changes toward zero, if an absolute value of the yaw angle exceeds a threshold which is variable in accordance with a wind-velocity parameter representing a magnitude of a wind velocity,
wherein the threshold increases with an increase in the wind-velocity parameter.

9. A method of controlling operation of a wind turbine which comprises a wind turbine rotor, a nacelle supporting the wind turbine rotor rotatably, and a yaw rotation part configured to rotate the nacelle, the method comprising:
a step of operating the yaw rotation part in a yaw rewind mode of rotating the nacelle in such a direction that a yaw angle changes toward zero, if an absolute value of the yaw angle exceeds a threshold which is variable in accordance with a wind-velocity parameter representing a magnitude of a wind velocity,
wherein the threshold increases with an increase in the wind-velocity parameter, and
the step of operating the yaw rotation part includes:
changing the yaw angle to within a predetermined angular range without making the nacelle follow a wind direction when the wind-velocity parameter is less than the threshold; and
changing the yaw angle until an absolute value of the yaw angle reaches 180 degrees or less and the nacelle follows the wind direction when the wind-velocity parameter is not less than the threshold value.

10. The method of controlling operation of a wind turbine according to claim 9,
wherein the threshold is set in stages in accordance with a plurality of ranges of the wind-velocity parameter.

11. The method of controlling operation of a wind turbine according to claim 9,
wherein the threshold is set to increase monotonically with an increase in the wind-velocity parameter.

12. The method of controlling operation of a wind turbine according to claim 9,
wherein a maximum value of the threshold is smaller than a hardware limit which is a rotational limit of the nacelle.

13. The method of controlling operation of a wind turbine according to claim 9, further comprising
setting the threshold to be larger during operation of the wind turbine than during a standby state of the wind turbine.

* * * * *